Feb. 4, 1936.  J. MIHALYI  2,029,932

RANGE FINDER FOR CAMERAS

Filed Sept. 6, 1934  2 Sheets-Sheet 1

Inventor:
Joseph Mihalyi,
By Newton M. Perrins
Rolla X. Carter
Attorneys

Feb. 4, 1936. J. MIHALYI 2,029,932
RANGE FINDER FOR CAMERAS
Filed Sept. 6, 1934 2 Sheets-Sheet 2
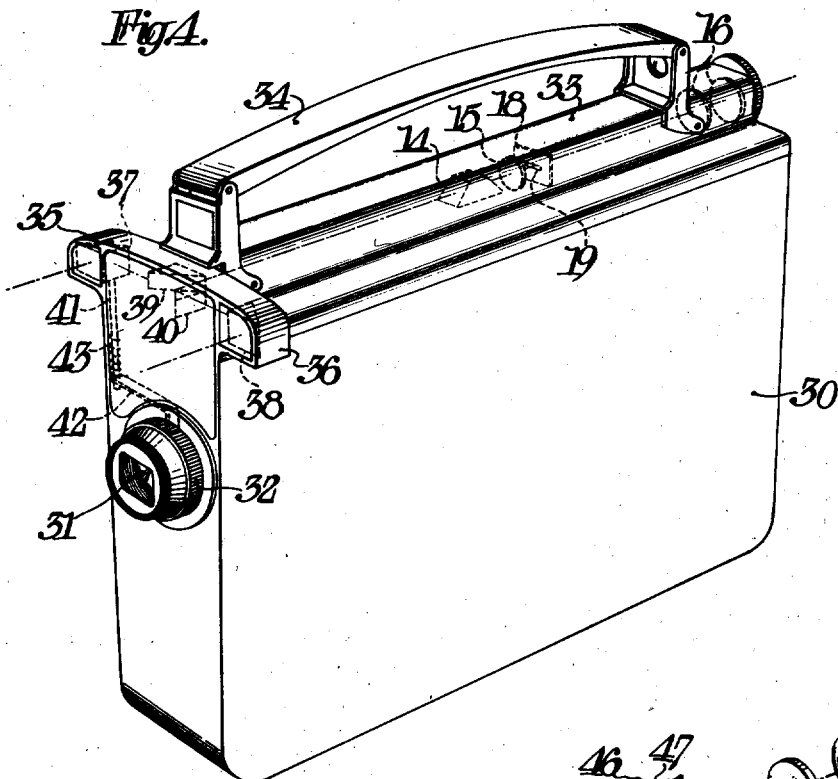
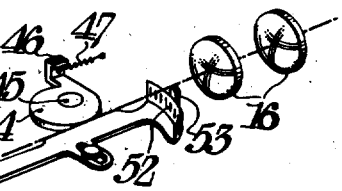
Inventor:
Joseph Mihalyi,
By Newton M Perrins
Rolla L Carter
Attorneys Patented Feb. 4, 1936

2,029,932

UNITED STATES PATENT OFFICE 2,029,932

RANGE FINDER FOR CAMERAS

Joseph Mihalyi, Rochester, N. Y., assignor to Eastman Kodak Company, Rochester, N. Y., a corporation of New York Application September 6, 1934, Serial No. 742,948

9 Claims. (Cl. 95—44)

My invention relates to range finders and particularly to range finders of the self-contained base split field type in which the range is determined by bringing the two partial images into coincidence.

In range finders of this general type which utilize a beam accepting and beam combining unit in combination with a telescope system, it is customary to position the objective or objectives of the telescope within either the beam accepting or beam combining unit. With this arrangement the objective or objectives must remain relatively fixed, and adjustment of the telescope to accommodate it to the individual characteristics of the eyes of various users necessitates adjustment of the ocular, which adjustment must generally be made near the eye of the observer and the over-all physical length of a given range finder is not readily adjustable.

It is an object of my present invention to provide a range finder in which the beam accepting and beam combining unit is independent from the telescope system of the range finder.

Another object of my invention is the provision of a coincidence type range finder which is so constructed that its over-all length is readily adjustable whereby it may be accommodated to cameras of different size, especially portable motion picture cameras.

Another object of my invention is to provide a camera in which movement of a part of the lens in focusing actuates the movable element of a range finder.

Other objects and advantages of my invention will become apparent to those skilled in the art from the following description when read in connection with the accompanying drawings, and its scope is pointed out in the appended claims.

Referring to the drawings—

Fig. 4 is a perspective view showing a motion picture camera provided with a range finder.

Fig. 5 is a view in perspective of an arrangement for adjusting a range finder independently of the camera objective.

Figure 1:
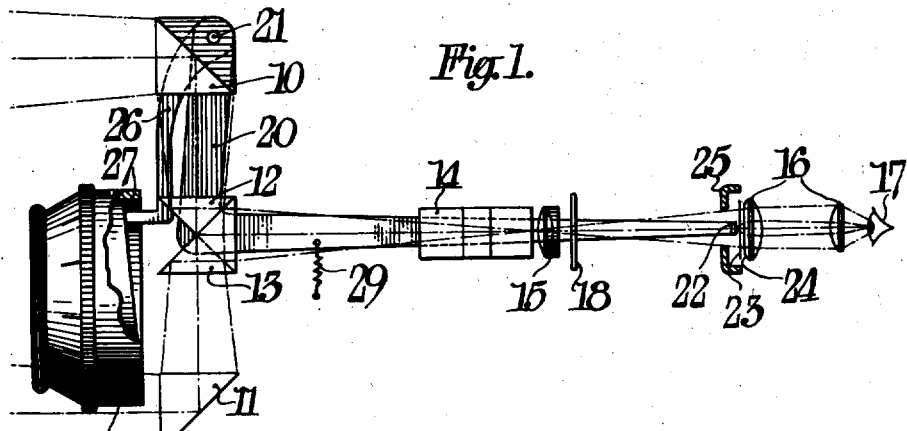
Fig. 1 is a plan view partly in section of the optical system of a range finder made in accordance with my invention.
Figure 2:
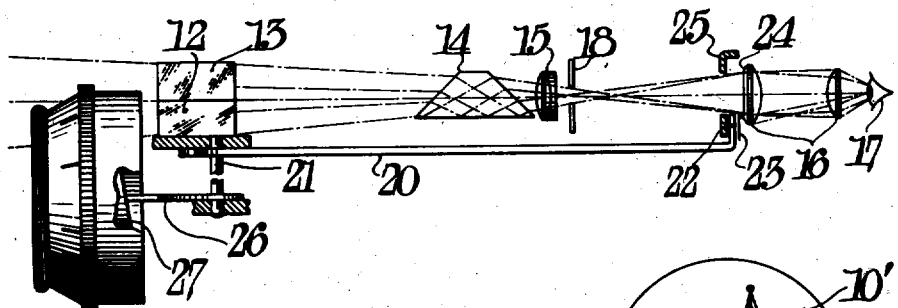
Fig. 2 is a side elevation, partly in section, of the arrangement shown in Fig. 1.

According to the present invention, the self-contained base type range finder shown in Figs. 1 and 2 comprises end prisms 10 and 11 forming the base of the system with prisms 12 and 13 forming the beam combining or coincidence prisms. A dove prism 14, positioned behind the coincidence prisms 12 and 13, inverts the light passing therethrough and directs it to an objective 15 of the telescope system. With this arrangement, an image viewed through the ocular by the eye 17 of an observer will appear upright. A diaphragm 18 having a narrow horizontal slot 19 is positioned adjacent the objective 15 for limiting the vertical beam passing through the objective 15 and serves to increase the depth of focus for horizontal images to bring the horizontal dividing line between the coincidence prisms 12 and 13 within the focus of the telescope. The diaphragm 18 is preferably located behind the objective.

In the arrangement just described, the spacing between the coincidence prisms 12 and 13 and the dove prism 14 is not critical and may be varied to adjust the over-all length of the range finder system to accommodate it to cameras of different size. This feature has considerable practical importance, since it is generally desirable to position the beam accepting prisms 10 and 11 near the front end of the camera and to position the ocular 16 near the rear end of the camera so that it may be conveniently held in position for use.

In order to deflect one of the beams accepted by the range finder, the prism 10 is mounted on an arm 20 in any suitable manner and adapted to rotate about a pivot 21 to which arm 20 is secured. If it is desired to be able to read the range determined by the range finder, the arm 20 may be extended along the optical axis and be provided at its end with an upturned portion 22 which is adapted to cooperate with a scale 23 to indicate the setting of the range finder. For rendering the scale 23 and its pointer 22 visible in the field of view of the ocular 16, the foremost lens element of this ocular may be provided with a spherical margin 24, as is well known. A diaphragm 25 lying in the focal plane of the ocular 16 and the objective 15 constitutes the conventional field stop of the telescope system.

Figure 3:
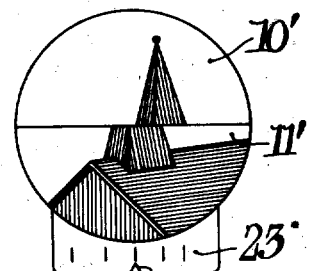
Fig. 3 shows the field of view together with the range scale as viewed through the eye-piece.

When an object, such as a church steeple, is viewed through the ranger finder above described, the observer will see an image field similar to that illustrated in Fig. 3, the upper half 10' being the image viewed through the beam accepting prism 10 and the lower half 11' being the image viewed through the beam accepting prism 11. Movement of the prism 10 about its pivot 21 to bring the two images 10' and 11' into coincidence will move the pointer 22 a corresponding amount so that it will indicate on the scale 23 the distance the observer is from the object being viewed. It will be understood that the scale 23 will be properly calibrated and numbered in any desired units of measurement.

In accordance with the invention, the pivot 21 supporting the arm 20 and the beam accepting prism 10, may be provided with an adjusting arm 26 which is adapted to be influenced by a spiral cam 27 carried by the focusing ring 28 of a camera objective, so that rotational movement of the ring 28 rotates the beam accepting prism 10, and when the images in the range finder are brought into coincidence, the objective will be properly focused. The arm 26 is resiliently held in engagement with the spiral cam 27 in any suitable manner, as by a coil spring 29 secured to the prism carrying arm 20, and anchored to any suitable part of a camera casing.

For a better understanding of the manner in which the range finder above described may be applied to a motion picture camera, reference is had to Fig. 4. In this figure a motion picture camera 30 having an objective 31 which may be focused by rotating the focusing ring 32 is provided on its top side with a longitudinal housing 33 for certain elements of the range finder. This housing 33 may conveniently be of less width than the camera proper and form a base upon which may be mounted a suitable carrying handle 34. The housing 33 may, at its forward end, expand to form two oppositely projecting chambers 35 and 36 in which are mounted the beam accepting light deflecting elements 37 and 38 which are here shown as being mirrors rather than prisms. The two beams of light received by the mirrors 37 and 38 are deflected onto coincidence mirrors 39 and 40, respectively, which in turn direct the two light beams to the dove prism 14 in the same manner as did the prisms 12 and 13 in the arrangement described in connection with Figs. 1 and 2. The mirror 37 is mounted to rotate with a rod 41 to which is secured, at its lower end, an arm 42 which contacts a cam surface provided on the focusing ring 32. A coil spring 43 surrounding the rod 41 serves to hold the arm 42 against the cam of the focusing ring 32, as is well understood.

It is frequently desirable to utilize the range finder carried by a camera for the purpose of measuring absolute distance, and this is especially true when other lenses are to be used on the camera, such as, for instance, telephoto lenses. To facilitate such a use of the range finder of my invention, I have provided, as is shown in the modification illustrated in Fig. 5, an auxiliary range finder actuating means comprising a cam member 44 journaled on a stud 45 and having a knurled end 46. A spring 47 biases the cam member 44 to a position corresponding to the shortest distance the range finder is adapted to determine. The arm 20 carrying the adjustable beam accepting prism 10 is held in engagement with the cam surface of the member 44 by means of a coil spring 48 acting through a lever 49 fulcrumed at 50 and having its upper end bearing against an ear 51, formed by turning down a portion of the arm 20, and its lower end bearing against the cam surface 27 of the focusing part of the objective as has already been described.

Rotational movement of the member 44 against the tension of the spring 47 causes the cam to rotate the arm 20 in a clockwise direction about its pivot 21 and against the tension of the spring 48, and accordingly rotates the beam accepting prism 10 to bring the two images into coincidence at which time the distance may be read off of a scale 52 carried by the outermost end of the arm 20. A stationary pointer 53 may be positioned adjacent the scale to aid the observer in reading the setting indicated by the range finder. After this reading is made, the cam member 44 is released and returns to its original position under the tension of the spring 47. The reading thus obtained may be used in setting the focus of a telephoto objective or for any other desired purpose.

Due to the fact that the range finder of my invention has its beam accepting and coincidence system independent from the telescope system, the beam accepting and coincidence system and the telescope ocular may be rigidly mounted on a camera in their most convenient positions and adjustment of the telescope to accommodate it to the eyes of different users may be made by movement of the telescope objective 15. This possibility lends itself readily to a very convenient adjusting arrangement, one suitable form of which is illustrated in Fig. 6.

In this arrangement the dove prism 14 and the telescope objective 15 are secured in fixed relation on a sheet metal plate 54 provided with slots 55 and frictionally held in place on the camera frame 56 by means of screws 57 and washers 58, which may be of leather. A turned-up bracket 59 for supporting the objective 15 is provided with a vertical open slot 60 into which extends a pin 61 eccentrically mounted on a disk 62 carried by a shaft 63 and journaled in the wall of the range finder housing 33. The shaft 63 is provided with a knurled knob 64 on the exterior of the housing 33 so that it may be manually rotated to adjust the dove prism 14 and the telescope objective 15 longitudinally of their optical axes and thereby adjust the telescope by varying the spacing between the objective 15 and the ocular 16. The dove prism 14 and the objective 15 are preferably supported a sufficient distance above the plate 54 to permit the indicating arm 20 to pass between them and the plate 54, thereby contributing to a very compact arrangement of parts.

Figure 6:
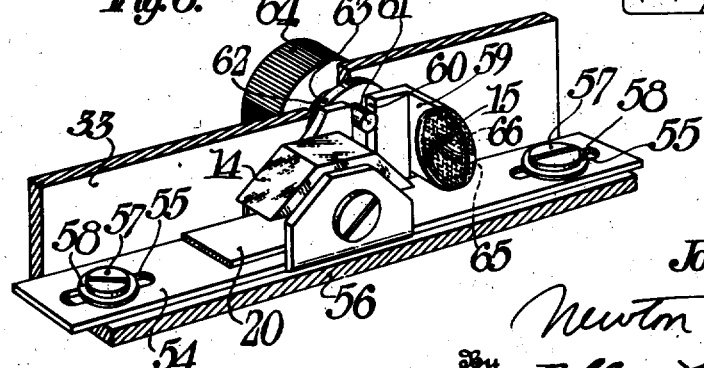
Fig. 6 is a partial view in perspective of an arrangement for adjusting the focus of the telescope of the range finder.

In the arrangement shown in Fig. 6, the beam passing through the objective 15 is limited in a vertical direction to a horizontal slot 65 by any suitable opaque substance 66 coated directly on the posterior surface of the objective lens 15. This diaphragm may, of course, comprise a separate element as shown in Figs. 1, 2, and 4.

It will be apparent from the several embodiments above described that my invention makes it possible and practical to equip economically cameras with range finders, since no critical focusing of the optical parts is demanded and identical sets of parts may be used to construct range finders differing in over-all length to adapt them to different camera sizes. Further, only a single objective lens is needed, and the distance between the base line and the ocular of the range finder may be made equal to the length of a motion picture camera without requiring the addition of an optical relay system. The objective of the telescope is not limited to one satisfying condition imposed by the spacing of the beam accepting prisms and the location of the coincidence prisms and may have relatively large magnification so that the base line of the range finder may be made much shorter than would otherwise be possible without sacrificing accuracy.

While I have illustrated my invention as applied to a motion picture camera, it will be understood that it is equally useful in connection with still cameras, and of course the range finder may be constructed and used as a separate unit.

Although in each embodiment of the invention I have shown a dove prism positioned in front of the telescope objective for erecting the image viewed through the range finder, it will be obvious that any other suitable arrangement may be employed for accomplishing this purpose, and of course the image erecting means may be dispensed with entirely without affecting the operativeness of the range finder.

Various other modifications will suggest themselves to those skilled in this art without departing from the spirit and scope of my invention as pointed out in the appended claims.

What I claim as new and desire to secure by Letters Patent of the United States is:

1. A photographic camera including a casing, a lens mount carried by the casing and having a part movable for focusing, a range finder mounted on said casing and provided with an operating lever adapted to be actuated in strict accordance with the focusing adjustment of the movable part of the lens mount, and means for actuating said operating lever independently of the movable part of said lens mount.

2. A photographic camera having a range finder and a lens, a coupling between the setting of the lens and an operating lever of the range finder, said finder including two beam accepting light deflecting elements spaced on a base line, a beam combining unit positioned to receive the beams deflected by said spaced elements and adapted to direct them as separate beams in a single direction, a telescope positioned to receive both of the separate beams and means for causing the images viewed through the telescope to appear upright.

3. The combination of a camera having a focusing lens and a range finder having an operating lever adapted to be actuated in accordance with the movement occurring in adjusting the focus of the lens, said finder including a beam accepting and a beam combining system and a telescope, said system and telescope being optically spaced so that the light passes serially through them.

4. A range finder particularly adapted for use on cameras having a focusing lens, comprising two beam accepting elements, a telescope having an objective lens, and means for directing the beams accepted by said elements to separate zones of said objective lens.

5. A range finder adapted to be coupled to the setting of a camera objective, comprising a beam accepting and beam combining unit, a telescope arranged behind said unit and including an objective lens, a diaphragm for limiting the vertical dimension of the beam passing through the objective lens to increase the depth of focus, whereby the dividing line of the beam combining unit becomes the dividing line between the two images as viewed through the telescope.

6. In combination, a camera having a focusing lens, a range finder having a movable element, and a coupling between said lens and said movable element, said range finder comprising end reflectors, a telescope objective and an ocular therefor, intermediate reflectors for deflecting the light rays from said end reflectors backwardly to the telescope objective, and a prism system for erecting the images viewed through the ocular.

7. The combination, in a focusing device for a camera having an adjustable lens, of a pair of reflecting devices forming the optical base of the focusing device, at least one of the reflecting devices being movable, a telescope system consisting of an objective and an ocular, a coincidence prism for directing the two light beams from said reflecting devices towards the telescope objective and having a separating edge parallel to said optical base, a diaphragm adjacent said objective for limiting the beams in a vertical direction to image said separating edge in the field of said ocular, and means for connecting said movable reflecting device with said adjustable lens in a fixed relationship, so that, when altering the adjustment of the lens in such a manner that the two half images coincide, the camera is in focus.

8. In combination, a camera, a range finder housing mounted on the camera and extending the full length thereof, a beam accepting and beam combining system mounted in the forward end of said housing, an ocular mounted in the rear end of said housing, an objective lens in said housing intermediate its ends, and means for adjusting said lens in a direction longitudinally of said housing.

9. A horizontal optical range finder adapted to be used on focusing cameras, comprising two horizontally spaced end reflectors, a telescope consisting of an objective and an ocular, two superposed reflectors for individually directing the light beams from said end reflectors to the objective of said telescope, whereby the image field as viewed through the telescope is divided horizontally, means for rotating at least one of said end reflectors to bring the images into vertical coincidence, and means controlling said means in accordance with the distance for which the camera is focused.

JOSEPH MIHALYI.